(12) United States Patent  (10) Patent No.: US 9,400,538 B2
Ramirez et al.  (45) Date of Patent: Jul. 26, 2016

(54) INFORMATION HANDLING SYSTEM DOCKING WITH CABLE BASED POWER AND VIDEO MANAGEMENT

(71) Applicant: Dell Products L.P., Round Rock, TX (US)

(72) Inventors: Ernesto Ramirez, Austin, TX (US); Christian L Critz, Georgetown, TX (US); Liam B Quinn, Austin, TX (US); Sean P O'Neal, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 307 days.

(21) Appl. No.: 14/026,220

(22) Filed: Sep. 13, 2013

(65) Prior Publication Data

US 2015/0082061 A1  Mar. 19, 2015

(51) Int. Cl.
*G06F 1/26* (2006.01)
*G06F 1/16* (2006.01)

(52) U.S. Cl.
CPC .............. *G06F 1/266* (2013.01); *G06F 1/1632* (2013.01); *G06F 2200/261* (2013.01); *Y02B 60/1296* (2013.01)

(58) Field of Classification Search
CPC ................................... Y02B 60/1296
See application file for complete search history.

(56) References Cited

U.S. PATENT DOCUMENTS

| | | | | | |
|---|---|---|---|---|---|
| 5,767,844 | A * | 6/1998 | Stoye | ..................... | G06F 1/3209 345/168 |
| 6,297,963 | B1 * | 10/2001 | Fogle | .................. | E05B 73/0005 361/679.41 |
| 6,364,697 | B1 * | 4/2002 | Tseng | ................... | G06F 1/1632 439/533 |
| 2004/0219824 | A1 * | 11/2004 | Conn | ....................... | G06F 1/181 439/490 |
| 2006/0288388 | A1 * | 12/2006 | Harris | .................... | G06F 1/1632 725/81 |
| 2008/0229091 | A1 * | 9/2008 | Abu-Akel | ............... | H04L 12/12 713/2 |
| 2009/0158423 | A1 * | 6/2009 | Orlassino | ................ | G06F 21/32 726/19 |
| 2009/0161303 | A1 * | 6/2009 | Hirota | .................... | G06F 1/1632 361/679.01 |
| 2009/0177901 | A1 * | 7/2009 | Chen | ....................... | G06F 3/023 713/310 |
| 2009/0302722 | A1 * | 12/2009 | Mihara | ................. | G06F 1/1616 312/223.2 |
| 2012/0030455 | A1 * | 2/2012 | McLaughlin | ........... | G06F 13/40 713/2 |
| 2012/0203949 | A1 * | 8/2012 | Benhard | ................. | G06F 13/14 710/303 |

OTHER PUBLICATIONS

WayBackMachine capture of "JM-204 Desktop Power Button Switch Module for PC" for sale at DealExtreme on Oct. 19, 2012.*

* cited by examiner

*Primary Examiner* — Thomas Lee
*Assistant Examiner* — Danny Chan
(74) *Attorney, Agent, or Firm* — Terrile, Cannatti, Chambers & Holland, LLP; Robert W. Holland

(57) ABSTRACT

A docking station connects through a docking port and docking cable with an information handling system to support communication between the information handling system and docking station peripherals. The docking cable includes an integrated input device, such as a mechanical button or fingerprint scanner, which accepts an end user input to command a power state transition at the information handling system, such as a transition between an on state and a reduced power state. The power state transition is sent directly from the integrated input device to the information handling system or, alternatively, from the integrated input device to the docking station and then from the docking station to the information handling system.

12 Claims, 3 Drawing Sheets

INFORMATION HANDLING SYSTEM DOCKING WITH CABLE BASED POWER AND VIDEO MANAGEMENT

BACKGROUND OF THE INVENTION

1. Field of the Invention

The present invention relates in general to the field of information handling system docking, and more particularly to information handling system docking with cable based power and video management.

2. Description of the Related Art

As the value and use of information between and across devices continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems perform a large number of functions for both individuals and for business use. Generally, information handling systems perform these functions by executing applications stored in local memory that create or alter information stored locally and at networked locations. As an example, enterprises typically have a data center that includes centralized storage of information and one or more server information handling systems that provide the information to client information handling systems through a network. In a conventional office environment, employees have work areas with a dedicated desktop information handling system that executes word processing, spreadsheet, web browsing and e-mail applications and connectivity to peripheral devices and platforms, that also may generate or consume data, so that employees can perform enterprise duties. Generally, each work area has a dedicated local area network Ethernet interface to provide the desktop information handling system with communication to the data center. In addition, each area includes dedicated and/or shared peripherals, such as a display, keyboard, mouse and shared networked printer. Often home office environments have a similar configuration built around a router or modem that provides Internet access and peripheral sharing instead of around a data center and server information handling system.

This conventional work area configuration makes sense for employees who work only in the work area during working hours, however, a growing number of employees work in less-conventional arrangements. For instance, many enterprises have adopted home office policies that allow employees to work from home on certain days or under certain circumstances. Generally, such employees are provided with a portable information handling system to perform enterprise duties. As the expense associated with such portable systems has decreased over time, enterprises have made portable systems available to a greater number of employees so that employees have the improved productivity generally provided by improved access to enterprise information. In addition, employees have generally taken advantage of the decreased cost of portable information handling systems by purchasing systems for personal use. One common example of portable information handling systems often purchased for personal use by employees is the smartphone, which allows employees to make phone calls, communicate by text and e-mail, and browse the Internet through personal wireless wide area network (WWAN) telephone accounts or Internet hotspots.

Although portable information handling systems provide end users with increased convenience in the accessing of information outside of a work space, portable information handling systems tend to have less convenient input/output interfaces. For example, portable information handling systems tend to have smaller displays than are provided by a desktop system display peripheral and integrated keyboards with smaller and/or less ergonomic key configurations. In the case of tablet information handling systems, such as smartphones, the integrated keyboard is typically a virtual keyboard presented on a touchscreen, which generally does not provide an efficient interface for end users to make inputs. Often, end users will interface with smartphones and other tablet information handling systems by using peripheral devices, such as wireless keyboards and mice; however, the convenience of using a portable information handling system is diminished where an end user has to carry around peripheral devices and set up the portable system to interact with the peripheral devices.

One conventional solution that helps make portable information handling systems more effective tools in a work space is a docking station that interfaces the portable information handling system with the work space resources. Conventional docking stations typically include a specialized connector that couples to a portable information handling system to provide direct system access for peripherals connected with the docking station. For example, a docking station with a specialized connector is placed in a work space on a desktop and then interfaced with work space peripherals. The docking station might, for instance, include: a DisplayPort port that couples the dock through a DisplayPort cable to a conventional display; USB ports that couple the dock through USB cables to a keyboard, mouse and printer; an Ethernet port that couples the dock to a local area network (LAN); and a power cable that accepts AC power and an adapter that converts the AC power to DC power. A portable information handling system has a specialized port in its bottom surface that accepts the docking station connector in a fixed position on the desktop. The specialized port interfaces at a motherboard level with components of the portable information handling system so that an end user, in effect, couples separately to each of the peripherals through one docking station connector as if the end user had directly interfaced each peripheral to a port of the portable information handling system.

The advantage offered by a conventional docking station is that an end user can effectively turn a portable information handling system with limited I/O capabilities into a desktop system with multiple peripherals by simply placing the portable system into the docking station. As an example, a portable information handling system with a clamshell configuration interfaces with a docking station in a closed position so that processing components interact with external peripherals, such as an external display and keyboard, while the integrated display and keyboard are unavailable. In such an example, the portable information handling system essentially becomes a desktop system when interfaced with the docking station. A difficulty with using a docked portable information handling system by interacting only through external I/O devices is that an end user sometimes has difficulty determining the operational status of the docked system. For instance, if the docked system enters a powered down or off state, an end user may have to open the system and interact with integrated I/O devices in order to bring the external peripheral devices to an operational state.

A disadvantage of conventional docking stations is that the addition of a specialized docking port and direct motherboard connections increases the design and fabrication costs for the portable information handling system as well as the size of the portable system. It also limits the type of client device that connects/docks with the docking platform. One alternative is to interface a docking station with a standardized port of the information handling system, such as a USB port. A disadvantage of this type of docking station interface is that peripheral information can exceed the bandwidth available through the standardized port. Further, using the peripheral port protocol to communicate with the docking station tends to introduce latency due to translation between native and port protocols. Some of the bandwidth limitations are addressed by using wireless interfaces for some peripherals, such as Bluetooth to interface a portable system with a keyboard; however, using multiple interfaces tends to defeat the simplicity associated with a docking station having a single interface. Another alternative is to define a specialized cable interface that provides bandwidth for multiple interface protocols, such as DisplayPort and USB, so that a portable information handling system can dock with external peripherals through a cable connector instead of a mother-board based connector. A disadvantage of a cable docking solution is that the inclusion of a specialized port in the housing of the information handling system decreases the room available for other types of ports. A further difficulty with a cable docking solution is that the docking station may be placed distal the information handling system and even out of sight. If the end user lacks a direct ability to physically access the docking station, the end user must interface with a power button of the information handling system to power up and down the information handling system.

SUMMARY OF THE INVENTION

Therefore, a need has arisen for a system and method which supports end user interaction with a docked information handling system at a cable interface of the dock and the information handling system.

In accordance with the present invention, a system and method are provided which substantially reduce the disadvantages and problems associated with previous methods and systems for interfacing an information handling system to a docking station in a work space. An input device integrated into a docking cable accepts an end user input and, in response to the end user input, adjusts a power state of an information handling system associated with a docking station. For example, each activation of the input device transitions an information handling system between selected ACPI power states. Commands to transition power states are coordinated by firmware of the information handling system and/or by firmware of the docking station.

More specifically, a docking station has one or more docking station ports that interface with one or more information handling systems through one or more docking cables, and plural peripheral ports that interface with peripheral device, such as displays, printers, keyboards, mice, etc. . . . A docking manager of the docking station coordinates peripheral, power and networking resources for use by an information handling system through communications supported by the docking cable and wireless networking resources. An input device integrated in the docking cable proximate a connector for an information handling system accepts end user inputs that adjust the power state of the information handling system, such as by cycling through ACPI states with each end user input as preset by an end user. For example, the integrated input device is a manual button that generates a signal for communication to the information handling system or docking station, such as an interrupt, that indicates an end user desire to transition from a reduced power state to an on state or vice versa. As another example, the integrated input device is a fingerprint authentication device that communicates authentication of authorization of an end user to access and/or power up an information handling system interfaced with the docking cable. A command to transition states at an information handling system may be generated with firmware of the information handling system in response to a signal from the input device sent through the cable, or may be generated at a docking station for communication to the information handling system through the docking cable or a wireless interface.

The present invention provides a number of important technical advantages. One example of an important technical advantage is that an end user may dock an information handling system to a docking station with I/O devices inactive and/or inaccessible, yet transition the information handling system between power states without interacting directly with an information handling system I/O device. For instance, a portable information handling system having a clamshell housing that rotates between open and closed positions transitions between ACPI power states in response to activation of a mechanical button integrated in a docking cable that initiates an interrupt detected by firmware on the information handling system. Since the docking cable button is separate from the information handling system, the unavailability of a power button or keyboard at the information handling system does not prevent use of the information handling system, such as when a system having a clamshell housing is in a closed configuration. Transition between power states by activation of the integrated input device may be performed with a signal sent directly from the input device to the information handling system or by coordination through the docking station. In one embodiment, the integrated input device includes an authentication device, such as a fingerprint authenticator, that authorizes access to the information handling system before transitioning the power state.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A docking station cable interface includes an input device integrated with the cable to interact with an information handling system coupled to a dock with the cable. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
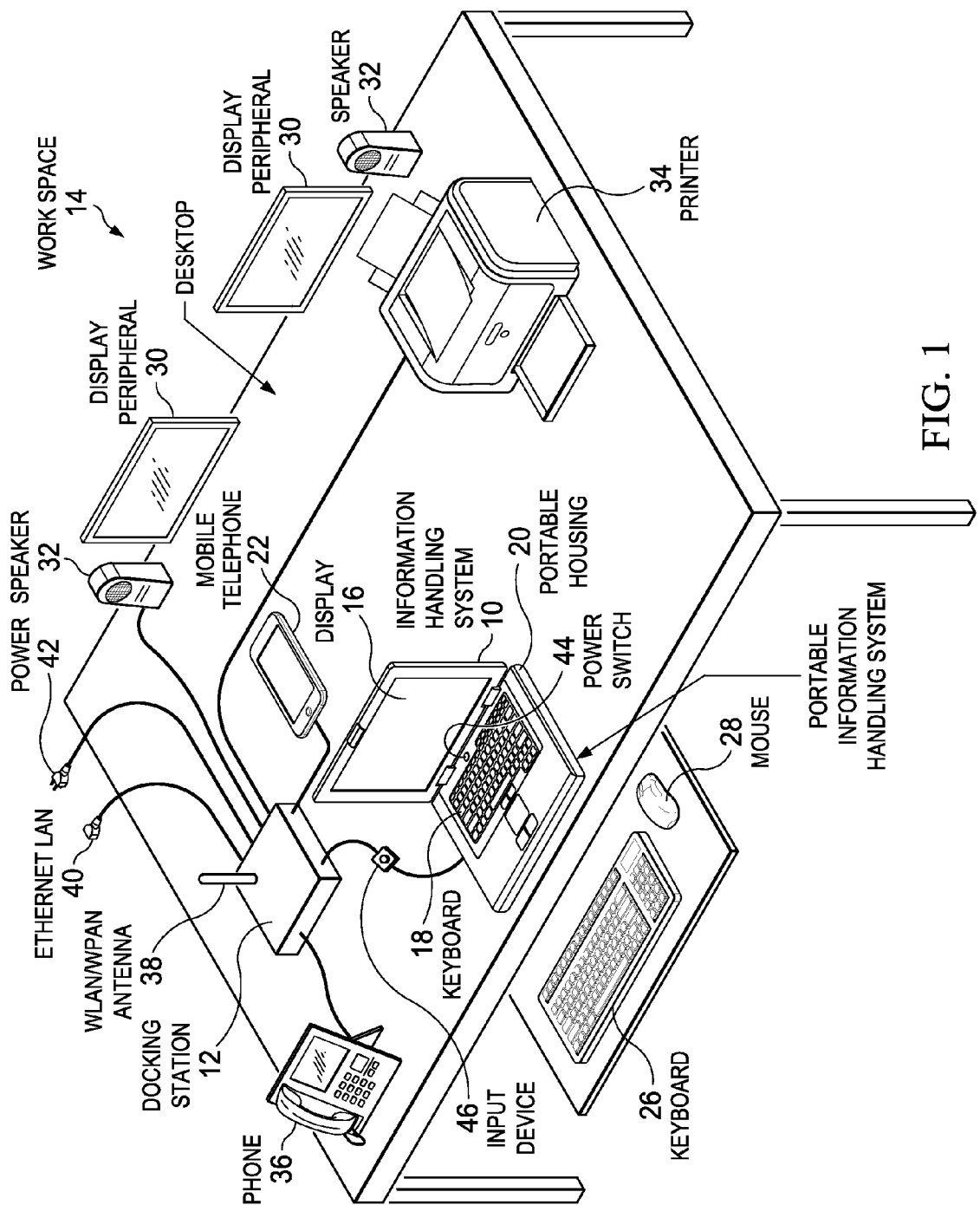
FIG. 1 depicts a portable information handling systems interfaced with a docking station and associated peripherals in a work space.

Referring now to FIG. 1, a portable information handling system 10 interfaces with a docking station 12 and associated peripherals in a work space 14. In the example embodiment, information handling system 10 is a portable information handling system having a rotationally-coupled display 16 and a keyboard 18 integrated with a portable housing 20, such as a conventional laptop with a clamshell configuration. In alternative embodiments, other types of portable information handling systems may interface with docking station 12, such as a mobile telephone 22 or similar tablet information handling system. In the example embodiment, portable information handling system 12 interfaces with a docking cable 24 that couples to a port of docking station 12 and portable information handling system 10. In alternative embodiments, portable information handling system 10 couples directly to docking station 12, such as by aligning an integrated docking port of portable information handling 10 over a docking port of docking station 12.

Docking station 12 provides an end user with a ready conversion at a work space 14 of portable information handling system 10 into a desktop-type of fixed configuration that interfaces with plural peripheral devices. For example, docking station 12 supports communication between information handling system 10 and a peripheral keyboard 26, a peripheral mouse 28, plural peripheral displays 30, peripheral speakers 32, a peripheral printer 34 and a peripheral telephone 36, such as a VoIP desktop telephone. Docking station 12 interfaces with the peripherals through cables that couple each peripheral to a peripheral port of docking station 12 or, alternatively, through wireless communication by wireless resources through a WLAN/WPAN antenna 38. Information handling system 10 communicates through docking cable 24 with docking station 12 to receive peripheral inputs and present outputs at the peripherals coupled to docking station 12. Docking station 12 provides a single connection point through which information handling system 10 interacts with the plural peripherals. In addition, docking station 12 provides infrastructure support to portable information handling system 10 for power and networking functions. For example, an Ethernet local area network (LAN) interface 40 provides network communications to docking station 12 to route and/or switch to portable information handling system 10. As another example, an external AC power connector 42 of docking station 12 accepts power from an AC supply and converts the power to a DC supply for transfer to information handling system 10 through docking cable 24.

In operation, docking station 12 supports operations of information handling system 10 through a single docking cable 24 by multiplexing information through plural data lanes of docking cable 24. For example, docking cable 24 combines a DisplayPort interface, with four data lanes, an auxiliary lane and a power interface, and a USB 2.0 interface, with two data lanes, to communicate visual and other peripheral information. Docking station 12 configures the data lanes and available wireless resources so that portable information handling system 10 operates in an efficient and effective manner. In the example embodiment, some examples of configurations include: four data lanes for DisplayPort and two data lanes for USB 2.0; two data lanes for DisplayPort and four data lanes for USB 3.0; and two data lanes for a first DisplayPort interface, two data lanes for a second DisplayPort interface, and two data lanes for a USB 2.0 interface. In alternative embodiments, additional data lanes may be included to support additional configurations. Docking managers of docking station 12 and information handling system 10 coordinate assignments of data lanes and wireless resources to meet processing needs and goals of an end user of information handling system 10. Some examples of configurations of data lanes are set forth in U.S. patent application Ser. No. 13/962,222, entitled "Information Handling System Docking with Coordinated Power and Data Communication," having the same inventors and assignee as the present application, and incorporated herein by reference as if fully set forth.

In the example depiction presented by FIG. 1, information handling system 10 has display 16 rotated to an open position relative to portable housing 20 so that integrated keyboard 18 is accessible to an end user. In addition, a power switch 44 is accessible to an end user with display 16 rotated to an open position so that an end user can power up or down information handling system 10. When display 16 rotates to a closed position over portable housing 20, power switch 44 and keyboard 18 become inaccessible so that an end user has to open display 16 in order to power up information handling system 10 to an on state from an off state, a hibernate state or a sleep state, such as the power states defined in ACPI S0 through S5 power states. In some instances, an end user may desire to leave display 16 in a closed position yet have access to a power button for manually selecting a power state at information handling system 10. In order to provide this flexibility to an end user, an input device 46 is integrated in docking cable 24 to accept manual inputs by an end user for selection of power states of information handling system 10. In one example embodiment, input device 46 is located at an end of docking cable 24 proximate to the connector that interfaces with information handling system 10. In alternative embodiments, input device may be located at different points of docking cable 24. In an example embodiment, input device 46 mimics the operation of power switch 44 so that an end user essentially has remote access to power switch 44 regardless of the position of display 16. In alternative embodiments, input device 46 provides remote access that mimics other types of input device integrated in portable housing 20, such as a fingerprint authentication device.

Input device 46 interfaces with signal, power and or ground lines of docking cable 24 so that activation by an end user is communicated through docking cable 24 to information handling system 10 or docking station 12. For instance, in one embodiment a dedicated auxiliary signal line of docking cable 24 receives a signal upon activation of input device 46 so that both information handling system 10 and docking station 12 respond to a request by an end user for a change to the information handling system power state. As another example, activation of input device 46 simulates a wake event using an auxiliary signal line, such as a simulation of a lid opening, a power switch press, a keyboard input, a mouse movement, a wake on WLAN or Bluetooth, or other type of wake event. The simulation may result from a signal sent directly from input device 46 or, alternatively, from a signal sent from input device 46 to docking station 12 that generates a power transition command, such as a wireless wake event. In one embodiment, a status indicator is included with input device 46 to indicate show the status of information handling system 10 as sleep, suspend, ready, awake, etc. . . . For instance, different colors of LED devices illuminate a finger print authentication device to indicate the status of information handling system 10, with power supplied by a power line of docking cable 24 and authentication indicated by a temporary ground of the power line.

In alternative embodiments, input device 46 has intelligence provided by a thin client system-on-chip (SoC) architecture so that docking cable 24 performs as a traditional thin client even if an information handling system 10 is not interfaced. A manual button of input device 46 wakes the thin client even if no device is connected to docking cable 24. An SoC architecture supports authentication, such as with a smartcard sensor or fingerprint sensor, and stores credential to provide verification of an authorized end user with an encrypted message sent through docking station 12. Alternatively, information gathered by a sensor at input device 46 is provided in an encrypted message to docking station 12 or information handling system 10 to allow authentication remote from input device 46.

Figure 2:
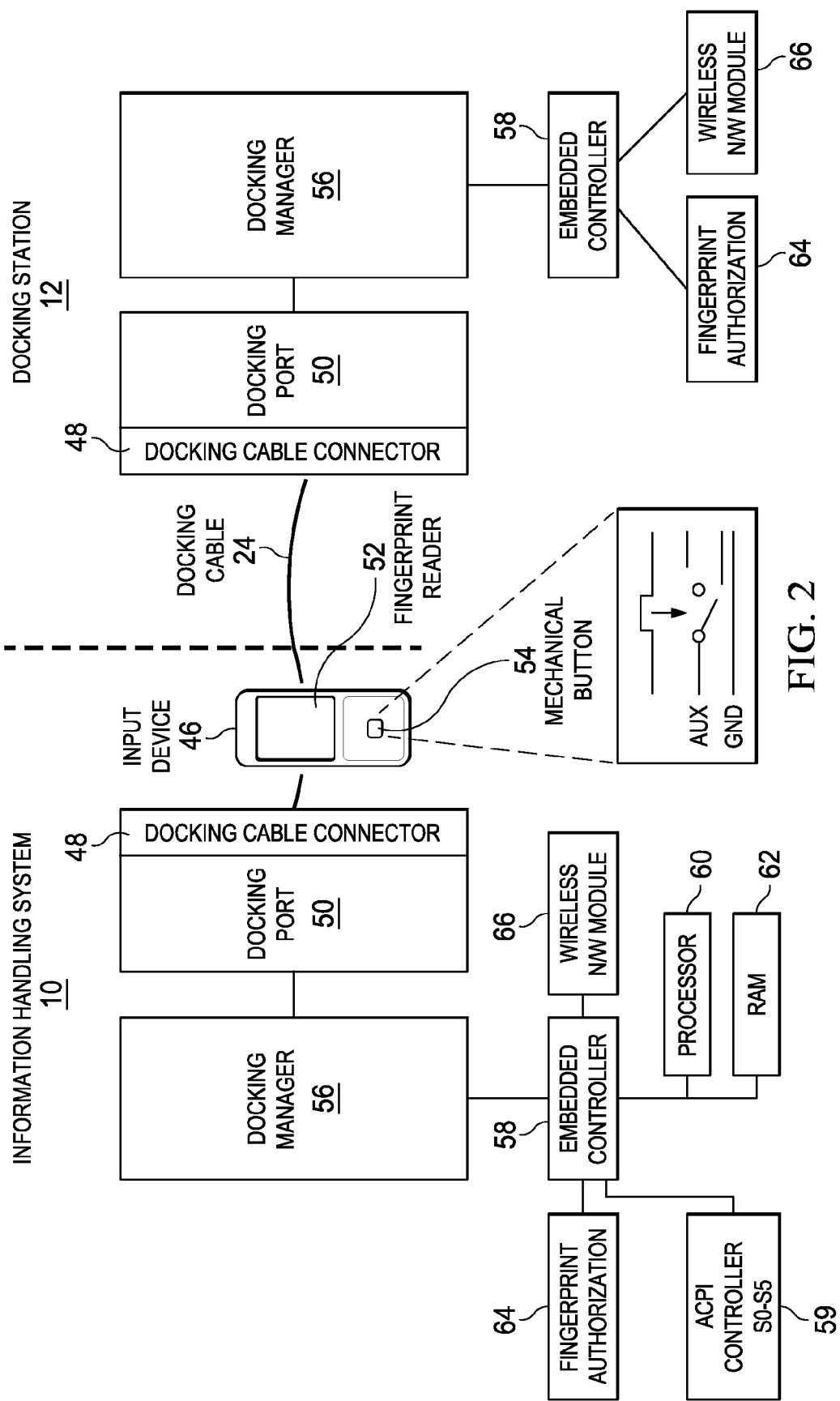
FIG. 2 depicts a block diagram of an information handling system and docking station interfaced by a docking cable with an integrated input device to transition power states of the information handling system.

Referring now to FIG. 2, a block diagram depicts an information handling system 10 and docking station 12 interfaced by a docking cable 24 with an integrated input device 46 to transition power states of the information handling system 10. Docking cable 24 has opposing ends with docking cable connectors 48, one of which is adapted to couple to information handling system 10 and the other adapted to couple to docking station 12. Input device 46 is integrated with docking cable 24 proximate to the docking cable connector 48 adapted to couple with a docking port 50 of information handling system 10. In one embodiment, input device 46 is built into docking cable connector 48 to be located directly next to information handling system 10 when coupled to docking port 50. In the example embodiment, input device 46 includes a fingerprint reader 52 and a mechanical button 54. Fingerprint reader 52 is powered from a power line of docking cable 24 and communicates through an auxiliary communication line, such as a DisplayPort auxiliary channel. Manual button 54 accepts a manual input that provides a temporary connection of the auxiliary communication line of docking cable 24 to ground to indicate a manual input through the auxiliary communication line. In alternative embodiments, input device 46 includes alternative detection schemes for detecting an end user input and communicating the input to information handling system 10 or docking station 12.

In operation, a docking manager at information handling system 10 and docking station 12 coordinate the response of information handling system 10 to an input at input device 46. Docking manager 56 at information handling system 10 includes firmware instructions that monitor docking port 50 to detect inputs indicative of a change in power state. In one embodiment, power for running docking manager 56 is provided from docking cable 24 to allow a response to signals even when information handling system 10 is in an off state. Upon detection of an input, docking manager 56 provides the input to an embedded controller 58 for action according to system firmware, such as the system BIOS running on embedded controller 58. For instance, embedded controller 58 applies ACPI controller logic 59 to respond to inputs received from input device 46 as if the inputs were received from a system power switch or keyboard. As an example, in an ACPI S3 state with a system processor 60 powered down and an operating system stored in RAM 62, embedded controller 58 responds to an input at input device 46 by returning the system to an on state. If the input is maintained for a predetermined time period, embedded controller 58 responds by forcing a power down to an off state, such as would happen if power switch 44 were held. In one embodiment, detection of an input at input device 46 with information handling system 10 powered up provides an indication of an informed undock via the operating system so that attached devices cease data transfers in lieu of an impending undocking event. For instance, input device 46 interfaces with a docking cable connector 48 release device to provide notice of an end user release of information handling system 10 from its connection to docking station 12. A fingerprint authentication module 64 receives inputs made at fingerprint reader 52 to authorized end user access to information handling system 10.

In an alternative embodiment, input device 46 communicates inputs to docking station 12 through docking cable 24 so that a docking manager 56 on docking station 12 can manage changes in the power state of information handling system 10 in response to the inputs. For instance, docking manager 56 detects a manual input to mechanical button 54 or a fingerprint reading from fingerprint reader 52 to an embedded controller 58 that runs firmware logic for changing the power state of information handling system 10. In the example of a manual input, a wireless network module 66 sends a wireless wake signal, such as a wake on wireless local area network or wake on Bluetooth signal to a wireless network module 66 of information handling system 10 to initiate a change in power state, such as a recovery from a reduced power state to an on state. In the example of a fingerprint reading, fingerprint authenticator 64 authenticates the end user based upon information provided by fingerprint reader 52 and, based upon the authentication, initiates a wireless wake with wireless network module 66. As an alternative, docking manager 56 and/or embedded controller 58 communicates a command to transition power states to information handling system 10 through docking cable 24. For instance, a command sent through docking cable 24 to docking manager 56 of information handling system 10 simulates an interrupt at embedded controller 58 that would result from an input made at a keyboard or mouse during an S3 reduced power state. Although similar elements are depicted at information handling system 10 and docking station 12 to implement power state transitions in response to an input at input device 46, the functions of waking and sleeping information handling system 10 may be distributed across a variety of different hardware and software components.

Figure 3:
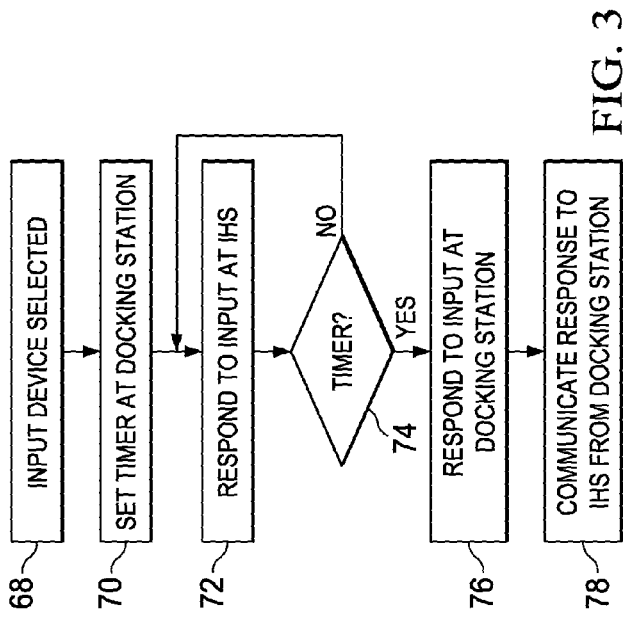
FIG. 3 depicts a flow diagram of a process for transitioning an information handling system power state based upon an input at a device integrated in a docking station cable.

Referring now to FIG. 3, a flow diagram depicts a process for transitioning an information handling system power state based upon an input at a device integrated in a docking station cable. The process begins at step 68 with detection of an input made at an input device integrated in the docking cable, such as pushing a mechanical button or reading a fingerprint. At step 70, a timer is set at the docking station to monitor whether the information handling system responds to the input within a time limit. At step 72, the input is detected at the information handling system for an appropriate response, such as initiation of a power transition between power states, such as ACPI power states. At step 74, a determination is made of whether the information handling system has responded before expiration of the timer. If not, the process returns to step 72 to provide additional time for a response by the information handling system. If the timer has expired at step 74, the process continues to step 76 to initiate a response to the input with the docking station 76, such as by sending a command with a wireless wake signal. At step 78, the docking station initiates the response to the input button, such as by commanding a transition of the power state at the information handling system. In one embodiment, if an information handling system fails to acknowledge the command, the docking station presents an error at a display for the end user.

Figure 4:
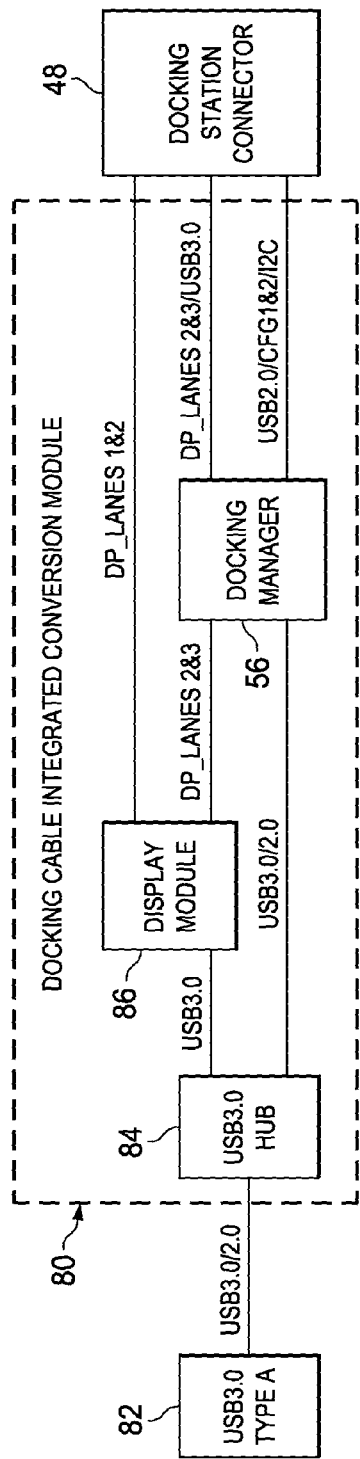
FIG. 4 depicts a block diagram of a docking station conversion unit integrated in docking cable for converting visual information between plural formats.

Referring now to FIG. 4, a block diagram depicts a docking station conversion unit integrated in docking cable 24 for converting visual information between plural formats. One difficulty with docking through a cable is that some systems will not have a connector adapted to accept a docking cable. In such instances, docking cable 24 includes a docking cable integrated conversion module 80 that converts information from a standard protocol, such as USB, to a docking station protocol, such as will interface through a docking station connector 48. In the example embodiment depicted by FIG. 4, a USB connector 82 interfaces with an information handling system USB port to accept information formatted with the USB protocol. The USB formatted information includes compressed display information and other types of information, such as network communications and peripheral device communications. The USB formatted information is communicated to a USB hub 84, where the compressed display information is separated and forwarded to a display module 86 for decompression. Non-display information is forwarded from USB hub 84 to a docking manager 56, where it is forwarded on through USB lanes in the USB protocol. Display module 86 decompresses the display information into uncompressed pixel level information, such as with the DisplayPort protocol, and provides the DisplayPort formatted information to docking manager 56 and docking connector 48 for communication to a docking station. Docking cable integrated conversion module 80 provides an intermediate integrated cable tool that converts USB formatted information for use by a docking station 12. Docking station 12 sees the connection as a normal docking connection so that legacy information handling systems that lack docking station ports can interface with docking station peripherals, albeit at a slower data transfer rate. Although power lines are not depicted, power transfer may be provided with a power transfer module that converts power provided from docking connector 48 according to the DisplayPort protocol to power provided by the USB protocol for use by the information handling system at USB connector 82. In an alternate embodiment, an information handling system that has a docking station connector interfaces with a USB docking station by connecting USB connector 82 to the USB docking station and connecting the docking station connector 48 to the information handling system.

Although the present invention has been described in detail, it should be understood that various changes, substitutions and alterations can be made hereto without departing from the spirit and scope of the invention as defined by the appended claims.

What is claimed is:

1. An information handling system comprising:
    a housing having a rotationally-coupled lid that rotates between open and closed positions, the closed position covering a power button to make the power button inaccessible to the end user;
    a processor disposed in the housing, the processor operable to execute instructions for processing information;
    memory disposed in the housing, the memory interfaced with the processor and operable to store the instructions and information;
    a docking manager disposed in the housing, the docking manager operable to manage interactions with an external docking station through a docking port;
    a docking port disposed in the housing and interfaced with the docking manager, the docking port having plural data lanes to communicate information with the external docking station; and
    a docking cable adapted to couple to the docking port at a first end and the external docking station at a second end, the docking cable having an integrated input device proximate the first end, the integrated input device operable to accept an end user input and initiate a change in a power state of the processor in response to the end user input, including at least commanding a power on of the processor with the housing lid in the closed position;
    wherein the integrated input device comprises a mechanical button that accepts an end user input and sends a signal to the external docking station in response to the end user input, the external docking station operable to command the change in power state of the processor in response to the end user input.

2. The information handling system of claim 1 wherein the change in a power state of the processor is a transition from a powered up state to a powered down state.

3. The information handling system of claim 1 wherein the integrated input device comprises a fingerprint reader powered from the external docking station that validates an end user fingerprint and initiates the change in the processor power state in response to validating the end user fingerprint.

4. The information handling system of claim 1 wherein the external docking station commands the change in power state of the processor with a signal sent through the docking cable.

5. The information handling system of claim 1 wherein the external docking station commands the change in power state of the processor with a wireless networking interface between the external docking station and the docking manager.

6. A method for initiating changes to a power state of an information handling system having a rotationally-coupled lid, the method comprising:
    inserting a docking cable into a docking port of the information handling system to interface the information handling system with an external docking station through the docking cable;
    activating an input device integrated in the docking cable proximate to the information handling system;
    communicating a signal in response to the activating from the input device to the information handling system; and
    initiating a change to the power state of the information handling system in response to the activating, the change to the power state including at least a power up of a processor with the information handling system in a closed position;

wherein the signal comprises a first signal sent from the input device to the external docking station and a second signal sent from the external docking station to the information handling system.

7. The method of claim 6 wherein the change to the power state comprises a transition from an on state to a reduced power state.

8. The method of claim 6 wherein the second signal comprises an interrupt communicated from the external docking station through the docking cable to firmware of a docking manager of the information handling system.

9. The method of claim 6 wherein the second signal comprises a wake on wireless local area network signal.

10. A docking station comprising:
a housing;
one or more docking ports disposed at the housing, each docking port configured to interface with an information handling system docking cable;
one or more peripheral ports disposed at the housing, each peripheral port configured to interface with a peripheral device;
a docking manager disposed in the housing and interfaced with the one or more docking ports, the docking manager operable to coordinate communication of information between an information handling system and the peripheral ports; and
a docking cable coupled to one of the one or more docking ports at a first end, the docking cable having an integrated input device proximate a second end, the second end adapted to interface with an information handling system having a rotationally-coupled lid that rotates between open and closed positions, the integrated input device operable to accept an end user input and, in response to the end user input, to command a transition of the information handling system from a first power state to a second power state, including at least power up from an off state to an on state with the information handling system in a closed position;
wherein integrated input device communicates a signal through the docking cable to the docking manager and the docking manager communicates a command to the information handling system in response to the signal, the command initiating the transition from the first power state to the second power state.

11. The docking station of claim 10 wherein the integrated input device comprises a fingerprint scanner operable to validate an end user fingerprint and to command the transition of the information handling system from the first power state to the second power state in response to detection of a valid end user fingerprint.

12. The docking station of claim 10 wherein the command comprises a wake on wireless local area network command issued from the docking station to the information handling system.

\* \* \* \* \*